(12) United States Patent
Kim et al.

(10) Patent No.: US 8,293,841 B2
(45) Date of Patent: Oct. 23, 2012

(54) OPTICAL FILM AND INFORMATION TECHNOLOGY APPARATUS COMPRISING THE SAME

(75) Inventors: Dong-Ryul Kim, Daejeon (KR); Boong-Goon Jeong, Daejeon (KR); Dae-Woo Nam, Daejeon (KR); Myeong-Geun Ko, Daejeon (KR)

(73) Assignee: LG Chem, Ltd. (KR)

( * ) Notice: Subject to any disclaimer, the term of this patent is extended or adjusted under 35 U.S.C. 154(b) by 803 days.

(21) Appl. No.: 12/319,472

(22) Filed: Jan. 7, 2009

(65) Prior Publication Data

US 2009/0292074 A1    Nov. 26, 2009

(30) Foreign Application Priority Data

Jan. 8, 2008 (KR) .......... 10-2008-0002347
Jun. 23, 2008 (KR) .......... 10-2008-0058908

(51) Int. Cl.
*C08G 73/02* (2006.01)
(52) U.S. Cl. .......................................... 525/185
(58) Field of Classification Search ............... 525/185
See application file for complete search history.

(56) References Cited

U.S. PATENT DOCUMENTS

| | | |
|---|---|---|
| 4,419,399 A | 12/1983 | Ichikawa et al. |
| 4,607,079 A | 8/1986 | Giles, Jr. et al. |
| 4,727,117 A | 2/1988 | Hallden-Abberton et al. |
| 5,004,777 A | 4/1991 | Hallden-Abberton et al. |
| 5,049,313 A | 9/1991 | Frentzel |
| 5,200,492 A | 4/1993 | Ohnaga et al. |
| 5,344,868 A | 9/1994 | Hallden-Abberton et al. |
| 5,710,216 A * | 1/1998 | Weber et al. ............ 525/132 |
| 5,891,357 A | 4/1999 | Akashi et al. |
| 5,905,554 A | 5/1999 | Kyu |
| 5,994,022 A | 11/1999 | Tanabe et al. |
| 6,080,833 A | 6/2000 | Otsuji et al. |
| 6,197,898 B1 | 3/2001 | van den Berg et al. |
| 7,875,328 B2 | 1/2011 | Um et al. |
| 2002/0018163 A1 | 2/2002 | Yamamoto et al. |
| 2002/0039651 A1 | 4/2002 | Murata |
| 2003/0043730 A1 | 3/2003 | Uchiyama et al. |
| 2003/0137620 A1 | 7/2003 | Wang et al. |
| 2004/0063887 A1 | 4/2004 | Toyomasu et al. |
| 2005/0046967 A1 | 3/2005 | Kosaka et al. |
| 2005/0068492 A1 | 3/2005 | Itoh et al. |
| 2005/0117099 A1 | 6/2005 | Yamaoka et al. |
| 2005/0129895 A1 | 6/2005 | Nakamura |
| 2006/0013967 A1 | 1/2006 | Mikoshiba et al. |
| 2006/0055853 A1 | 3/2006 | Murakami et al. |
| 2006/0063858 A1 | 3/2006 | Kang et al. |
| 2006/0066787 A1 | 3/2006 | Yoda et al. |
| 2006/0066946 A1 | 3/2006 | Liu et al. |
| 2006/0093845 A1 | 5/2006 | Chien et al. |
| 2006/0177607 A1 | 8/2006 | Ohmori et al. |
| 2006/0252234 A1 | 11/2006 | Saiki |
| 2007/0141355 A1 | 6/2007 | Kosaka et al. |
| 2007/0172181 A1 | 7/2007 | Imai et al. |
| 2007/0282077 A1 | 12/2007 | Miyamoto et al. |
| 2009/0197020 A1 | 8/2009 | Kim et al. |
| 2009/0275718 A1 | 11/2009 | Um et al. |

FOREIGN PATENT DOCUMENTS

| | | |
|---|---|---|
| CN | 101087846 A | 12/2007 |
| EP | 0717078 A1 | 6/1996 |
| EP | 1865346 A1 | 12/2007 |
| EP | 1933181 | 6/2008 |
| JP | 62-89705 A | 4/1987 |
| JP | 4146984 A | 5/1992 |
| JP | 7157632 A | 6/1995 |
| JP | 08248202 A | 9/1996 |
| JP | 10-030048 A | 2/1998 |
| JP | 2000256635 A | 9/2000 |
| JP | 2001-220515 A | 8/2001 |
| JP | 2002243943 A | 8/2002 |
| JP | 2002301788 A | 10/2002 |
| JP | 2003315557 A | 11/2003 |
| JP | 2004-204208 A | 7/2004 |
| JP | 2005070534 A | 3/2005 |
| JP | 2005266464 A | 9/2005 |
| JP | 2006220726 A | 8/2006 |
| JP | 2007-031537 A | 2/2007 |
| JP | 2007046044 A | 2/2007 |
| JP | 2007169583 A | 7/2007 |
| JP | 2007169586 A | 7/2007 |
| JP | 2007263987 A | 10/2007 |
| JP | 2007321108 A | 12/2007 |
| KR | 20030069461 A | 8/2003 |
| KR | 20040029251 A | 4/2004 |
| KR | 20040045790 A | 6/2004 |
| KR | 20050065154 A | 6/2005 |
| KR | 20050083709 A | 8/2005 |
| KR | 2005-23083 A | 9/2006 |

(Continued)

OTHER PUBLICATIONS

JPO Website Machine English Translation of JP 2004-204208, Suzuki, Jul. 22, 2004.
International Search Report, PCT/KR2009/002303, dated Dec. 12, 2009.
International Search Report, PCT/KR2009/002302, dated Nov. 10, 2009.
U.S. Appl. No. 12/319,471.
U.S. Appl. No. 12/319,469.
U.S. Appl. No. 12/387,549.
Extended European Search Report (EESR) issued on Jul. 5, 2011 in the corresponding European patent application No. 09700270.

(Continued)

*Primary Examiner* — Edward Cain
(74) *Attorney, Agent, or Firm* — Lerner, David, Littenberg, Krumholz & Mentlik, LLP

(57) ABSTRACT

The present invention relates to an optical film in which a photoelasticity coefficient is easily controlled according to the content of an aromatic based resin having a chain having the hydroxy group containing portion and aromatic moiety, a method for manufacturing the same, and an information electronic device comprising the optical film.

6 Claims, 2 Drawing Sheets

FOREIGN PATENT DOCUMENTS

| | | |
|---|---|---|
| KR | 20070003388 A | 1/2007 |
| KR | 20070113749 A | 11/2007 |
| TW | 200717045 | 5/2007 |
| TW | 200732690 A | 9/2007 |
| WO | 03070849 A1 | 8/2003 |
| WO | 2008/001855 A1 | 1/2008 |

OTHER PUBLICATIONS

Hcengpei Wu et al: "Miscibility of Phenoxy Polymer/Polyacrylate Blends", Macromolecular Chemistry and Physics, Wiley-VCH Verlag, Weinheim, DE, vol. 197 No. 10, Oct. 1, 1996, pp. 3191-3197, XP 000634279.

Supplementary European Search Report EP 09700848, dated Mar. 18, 2011.

International Search Report PCT/KR2009/000106, dated Aug. 20, 2009.

International Search Report PCT/KR2009/000105, dated Aug. 26, 2009.

Office Action from KR Application No. 10-2009-0001500, dated Feb. 8, 2011.

Office Action from KR Application No. 10-2009-0001501, dated Feb. 8, 2011.

Young Soo Soh: "Miscibility of Polymethyl Methacrylate With Poly (Hidroxy Ether) of Bisphenol A" Journal of Applied Polymer Science, John Wiley and Sons Inc. New York, US, vol. 45, No. 10, Aug. 5, 1992, pp. 1831-1835 XP 000281210.

JPO Website Machine English Translation of JP 07-304870, Matsumoto et al., Nov. 21, 1995.

Chinese Office Action for 200980101851.2 dated Feb. 29, 2012.

Supplementary European Search Report for EP09739004 dated Mar. 22, 2012.

Office Action from Taiwan for Application No. 098100472 dated Jul. 11, 2012.

\* cited by examiner

OPTICAL FILM AND INFORMATION TECHNOLOGY APPARATUS COMPRISING THE SAME

TECHNICAL FIELD

The present invention relates to an optical film, which has excellent heat resistance, durability, processability, and optical transparency, low haze, an excellent optical property, is not easily broken, excellent mechanical strength, a small change in retardation by external stress because the photoelasticity coefficient is controlled, and a reduced light leakage phenomenon, a method for manufacturing the same, and an information electronic device including the same.

This application claims priority from Korean Patent Application Nos. 10-2008-0002347 and 10-2008-0058908 filed on Jan. 8, 2008 and Jun. 23, 2008 in the KIPO, the disclosure of which is incorporated herein by reference in its entirety.

BACKGROUND ART

Recently, display technologies using various methods such as a plasma display panel (PDP), a liquid crystal display (LCD) and the like that are used instead of a known braun tube in accordance with the development of optical technologies are suggested and sold. The higher properties of the polymer material for displays are required. For example, in the case of the liquid crystal display, according to the development toward the thin film, the lightness, and enlargement of the picture area, the wide viewing angle, the high contrast, the suppression of change in picture color tone according to the viewing angle and the uniformity of the picture display are particularly considered as important problems.

Therefore, various polymer films such as a polarizing film, a polarizer protection film, a retardation film, a plastic substrate, a light guide plate and the like are used, and as the liquid crystal, various modes of liquid crystal displays such as twisted nematic (TN), super twisted nematic (STN), vertical alignment (VA), in-plane switching (IPS) liquid crystal cells are developed. Since these liquid crystal cells have all intrinsic liquid crystal alignment, the intrinsic optical anisotropic property is ensured, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. Thus, a retardation compensation according to the kind of liquid crystal molecule is required. For example, since most liquid crystal molecules that are used in a vertical alignment manner have the thickness refractive index that is larger than the average in-plane refractive index in a liquid crystal display surface, in order to compensate this, a compensation film in which the thickness refractive index is smaller than the average in-plane refractive index is required.

In addition, light does not pass through the front sides of two polarizing plates that are vertical to each other, but if the angle is inclined, the light axes of two polarizing plates are not vertical to each other, thus light leakage occurs. In order to compensate this, the compensate film having the in-plane retardation is required. In addition, the display device using the liquid crystal requires both the thickness retardation compensation and the in-plane retardation compensation in order to widen the angle view.

Requirement of the retardation compensation film is to easily control the birefringence. However, The film birefringence is formed by a basic birefringence which belongs to the material and the alignment of polymer chains in the film. The alignment of the polymer chains is mostly forcibly performed by force applied from the outside or is caused by the intrinsic properties of the material, and the alignment method of the molecules by the external force is to uniaxially or biaxially stretch the polymer film.

In the related art, there is a need to develop a polymer material that satisfies the above requirement properties in order to be used in displays.

DISCLOSURE

Technical Problem

It is an object of the present invention to provide an optical film which has excellent optical property and optical transparency, and low haze, is not easily broken unlike an acryl based film that is easily broken while stretching and alignment processes are carried out, has excellent mechanical strength, processability, and durability such as heat resistance, a reduced light leakage phenomenon, and a small change in retardation by external stress because the photoelasticity coefficient is controlled, and an information electronic device including the same.

Technical Solution

The present invention provides an optical film that comprises an aromatic based resin comprising a chain having the hydroxy group containing portion and aromatic moiety. A photoelasticity coefficient is in the range of more than $-3.5 \times 10^{-12} m^2/N$ and less than $60.55 \times 10^{-12} m^2/N$.

In addition, the present invention provides an optical film that comprises an aromatic based resin comprising a chain having the hydroxy group containing portion and aromatic moiety. The content x of the aromatic based resin and a photoelasticity coefficient y are in direct proportion to each other. Here, the direct proportion equation may be represented by the equation [$y=ax-b$ (here, a and b are constants)].

In addition, the present invention provides an optical film that comprises a (meth)acrylate based resin comprising one or more (meth)acrylate based derivatives; and an aromatic based resin having a chain having the hydroxy group containing portion and aromatic moiety.

In addition, the present invention provides a method for controlling a photoelasticity coefficient of an optical film by controlling the content of an aromatic based resin having a chain having the hydroxy group containing portion and aromatic moiety.

In addition, the present invention provides a method for preparing an optical film, controlling photoelasticity coefficient of an optical film by controlling the content of an aromatic based resin having a chain having the hydroxy group containing portion and aromatic moiety while the resin composition is prepared and the method controls, wherein the method comprises preparing a resin composition comprising a (meth)acrylate based resin comprising one or more (meth)acrylate based derivatives, and an aromatic based resin having a chain having the hydroxy group containing portion and aromatic moiety; and shaping a film by using the resin composition.

In addition, the present invention provides an information electronic device comprising the optical film.

Advantageous Effects

An optical film according to the present invention has excellent optical property and optical transparency, and low haze, is not easily broken unlike an acryl based film that is easily broken while stretching and alignment processes are carried out, has excellent mechanical strength, processability, and heat resistance, a reduced light leakage phenomenon, and a small change in retardation value by the external stress since the photoelasticity coefficient is controlled. In particular, in the present invention, by finding that the content of the aromatic resin having a chain and aromatic moiety having the hydroxy group and the photoelasticity coefficient satisfy the direct linear proportion equation, the content of the aromatic resin is controlled and thus the photoelasticity coefficient of the film may be easily controlled.

Accordingly, the optical films may be applied to IT (information and electron) devices such as display devices and the like for various purposes.

BEST MODE

Figure 1:
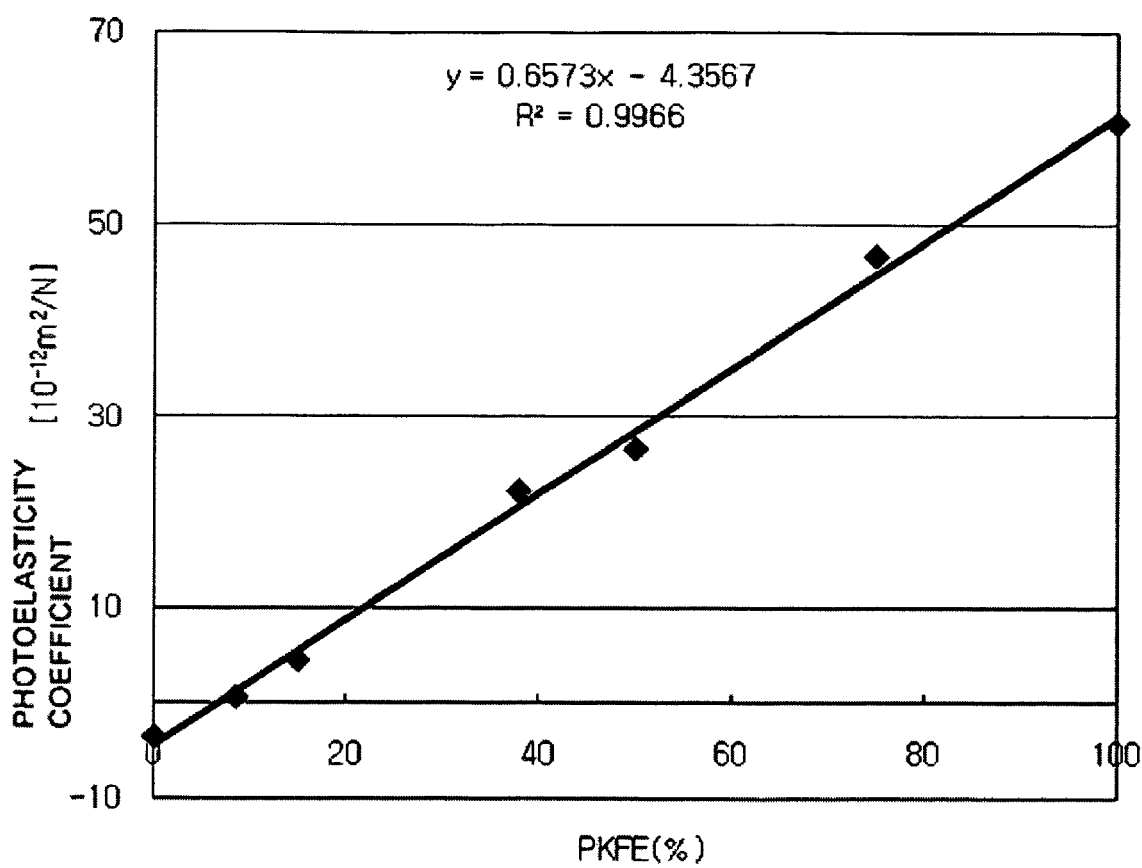
FIG. 1 illustrates a correlation of the content of the aromatic resin comprising chain and aromatic moiety having the hydroxyl group containing portion and the photoelasticity coefficient in an optical film manufactured in Example.

An optical film according to an embodiment of the present invention comprises an aromatic based resin comprising a chain having the hydroxy group containing portion and aromatic moiety. A photoelasticity coefficient is in the range of more than $-3.5\times10^{-12}m^2/N$ and less than $60.55\times10^{-12}m^2/N$. In other words, the present invention may easily provide an optical film having any value of the photoelasticity coefficient in the range of more than $-3.5\times10^{-12}m^2/N$ and less than $60.55\times10^{-12}m^2/N$. Therefore, according to the present invention, in consideration of the purpose of the optical film or other conditions, the optical film having the desired photoelasticity coefficient selected from the above range may be used. For example, if the optical film having a small change in a retardation value is manufactured by using an external stress, the optical film in which the photoelasticity coefficient is in the range of more than $-3.5\times10^{-12}m^2/N$ and $50\times10^{-12}m^2/N$ or less, preferably $-3.05\times10^{-12}m^2/N$ or more and $27\times10^{-12}m^2/N$ or less, and more preferably $-1.1\times10^{-12}m^2/N$ or more and $2\times10^{-12}m^2/N$ or less may be used. In the case of when the optical film having a small change in retardation value by the external stress is used, an effect of largely reduced light leakage may be obtained.

In addition, an optical film according to another embodiment of the present invention comprises an aromatic based resin comprising a chain having the hydroxy group containing portion and aromatic moiety. The content x of the aromatic based resin and a photoelasticity coefficient y are in direct proportion to each other. Here, the direct proportion equation may be represented by the equation [y=ax−b (here, a and b are constants)]. The constants a and b may vary according to the test condition, the composition of components used in conjunction with the aromatic based resin, a measurement error and the like.

The photoelasticity coefficient of the optical film according to the present invention may be easily controlled according to the content of the aromatic based resin having the chain having the hydroxy group containing portion and aromatic moiety.

The optical film may further include a (meth)acrylate based resin comprising one or more (meth)acrylate based derivatives. Accordingly, the optical film according to another embodiment of the present invention comprises a (meth)acrylate based resin comprising one or more (meth)acrylate based derivatives; and aromatic based resin having the chain having the hydroxy group containing portion and aromatic moiety.

The optical film according to the present invention has excellent physical properties unlike the acryl based film that is easily broken. In addition, the (meth)acrylate based resin may provide excellent optical properties, and the aromatic based resin may provide the excellent miscibility with the compound comprising the (meth)acrylate based resin. In addition, the optical film according to the present invention has excellent mechanical properties in addition to toughness by the aromatic based resin having the chain having the hydroxy group containing portion and aromatic moiety. The optical film according to the present invention may further a cyclic based unit having a cyclic portion. The cyclic based unit may be included in the (meth)acrylate based resin, and may be included as a separate compound in respects to the (meth)acrylate based resin or the aromatic based resin. The cyclic based unit may provide excellent heat resistance to the film.

The optical film according to the present invention may control the miscibility of the resin composition according to the contents of a (meth)acrylate based resin, a aromatic based resin having a chain having the hydroxy group containing portion and aromatic moiety, and the cyclic based unit having the cyclic portion.

The content of each resin is not particularly limited, and in consideration of the role of each component, in order to obtain desired optical property, mechanical property, transparency, miscibility and the like, the content of each unit may be determined. For example, the contents of the (meth)acrylate based resin, the aromatic based resin having the chain having the hydroxy group containing portion and aromatic moiety and the cyclic based unit having the cyclic portion each may be selected within a range of about 0.1 to 99% by weight. It is preferable that, the content of (meth)acrylate based resin is in the range of about 39 to about 98% by weight, the content of the aromatic based resin having the chain having the hydroxy group containing portion and aromatic moiety is in the range of about 0.5 to about 60% by weight, and the content of the cyclic based unit is in the range of about 0.5 to about 40% by weight. In the case of when the optical film according to the present invention is used as an optical film having a small change in retardation value by the external stress, the content of the aromatic based resin having the chain having the hydroxy group containing portion and aromatic moiety is in the range of more preferably more than 0% by weight and 80% by weight or less, more preferably in the range of 2% by weight to 50% by weight, and more preferably 5% by weight to 10% by weight.

In the present invention, the compound comprising the (meth)acrylate based resin, the aromatic based resin having the chain having the hydroxy group containing portion and aromatic moiety, or the cyclic based unit having the cyclic portion may be a homopolymer or a copolymer, and within a range in which the object of the present invention is not spoiled, a comonomer may be further included. The copolymer may be a random or block copolymer.

In the present invention, it should be understood that the (meth)acrylate based resin may include (meth)acrylate and a (meth)acrylate derivative. To be specific, as the (meth)acrylate based monomer, there are methyl methacrylate, methyl acrylate, ethyl acrylate, butyl acrylate, 2-ethylhexyl methacrylate, lauryl methacrylate, benzyl methacrylate and the like, but it is not limited thereto. In particular, it is most preferable that methyl methacrylate (MMA) is used.

The (meth)acrylate based resin may be a homopolymer or a copolymer of the (meth)acrylate based derivative, and may be a copolymer comprising another kind of comonomer.

In the present invention, as the (meth)acrylate based resin, a copolymer comprising the (meth)acrylate based unit and the cyclic based unit having the cyclic portion may be used. In the case of when the (meth)acrylate based resin includes the cyclic based unit, the (meth)acrylate based resin may include the copolymer including at least one two kinds or more of the (meth)acrylate based derivative and the cyclic based unit.

The content of the (meth)acrylate based unit in the copolymer comprising the cyclic based unit having the (meth)acrylate based unit and the cyclic portion is in the range of about 50 to 99% by weight, and preferably in the range of about 70 to about 98% by weight, and the content of the cyclic based unit having the cyclic portion is in the range of about 1 to 50% by weight and preferably about 2 to about 30% by weight. When the content of the cyclic based unit having the cyclic portion is 50% by weight or less, it is useful to reduce a haze value of the film.

The cyclic based unit having the cyclic portion of the copolymer comprising the (meth)acrylate based unit and the cyclic based unit having the cyclic portion functions to improve heat resistance of the film. Examples of the cyclic based unit having the cyclic portion will be described below. However, it is most preferable that the cyclic based unit having the cyclic portion, which is included in the copolymer in conjunction with the (meth)acrylate based unit, is a maleimide based unit including a maleimide portion. The maleimide based unit may include a cyclic portion that is derived from N-cyclohexylmaleimide, N-phenylmaleimide, N-methylmaleimide, N-butylmaleimide and the like, but is not limited thereto. In particular, it is most preferable that it includes the cyclic portion that is derived from N-cyclohexylmaleimide. However, the above examples are provided to illustrate the present invention, but not to limit the range of the present invention.

The copolymer comprising the (meth)acrylate based unit and the cyclic based unit having the cyclic portion may be manufactured by a method such as a bulk polymerization, a solution polymerization, a suspension polymerization, an emulsion polymerization and the like using a cyclic based monomer such as a (meth)acryl based monomer and a maleimide based monomer.

In the present invention, it is preferable that the number average molecular weight of the aromatic based resin comprising the chain having the hydroxy group containing portion and aromatic moiety is in the range of 1,500 to 2,000,000 g/mol. It is preferable that the aromatic based resin includes the phenoxy based resin. Here, the phenoxy based resin includes a structure in which at least one oxygen radical is bonded to the benzene cycle. For example, the aromatic based resin having the chain having the hydroxy group containing portion and aromatic moiety may include one or more units that are represented by the following Formula 1. the aromatic based resin includes 5 to 10,000 of the unit of the following Formula 1, preferably 5 to 7,000 of the unit of the following Formula 1, and more preferably 5 to 5,000 of the unit of the following Formula 1. In the case of when two kinds or more units of the following Formula 1 are included in the aromatic based resin, they may be included in a random form, an alternating form, or a block form.

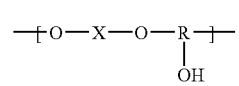
[Formula 1]

wherein X is a divalent group comprising at least one benzene cycle and R is a straight- or branched-chained alkylene group having 1 to 6 carbon atoms.

To be specific, it is preferable that X is a divalent group that is derived from the compounds of the following Formulas 2 to 4, but is not limited thereto.

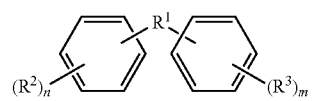
[Formula 2]

$R^1$ is a direct bond, straight- or branched-chained alkylene having 1 to 6 carbon atoms, or cycloalkylidene having 3 to 20 carbon atoms, $R^2$ and $R^3$ are each hydrogen, straight- or branched-chained alkyl having 1 to 6 carbon atoms, or straight- or branched-chained alkenyl having 2 to 6 carbon atoms, and n and m are each an integer in the range of 1 to 5.

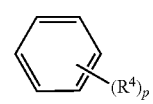
[Formula 3]

$R^4$ is each hydrogen, straight- or branched-chained alkyl having 1 to 6 carbon atoms, or straight- or branched-chained alkenyl having 2 to 6 carbon atoms, and p is an integer in the range of 1 to 6.

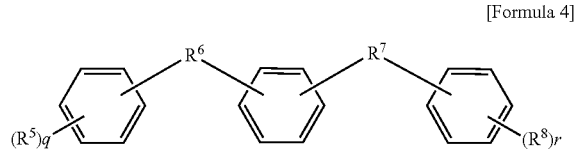
[Formula 4]

$R^6$ and $R^7$ are each a direct bond, straight- or branched-chained alkylene having 1 to 6 carbon atoms, or cycloalkylidene having 3 to 20 carbon atoms, $R^5$ and $R^8$ are each hydrogen, straight- or branched-chained alkyl having 1 to 6 carbon atoms, or straight- or branched-chained alkenyl having 2 to 6 carbon atoms, and q and r are each an integer in the range of 1 to 5.

Detailed examples of the compounds that is represented by Formulas 2 to 4 are the same as the following compounds, but are not limited thereto.

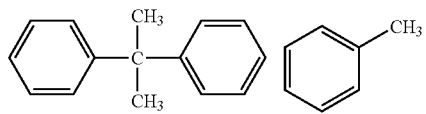

-continued

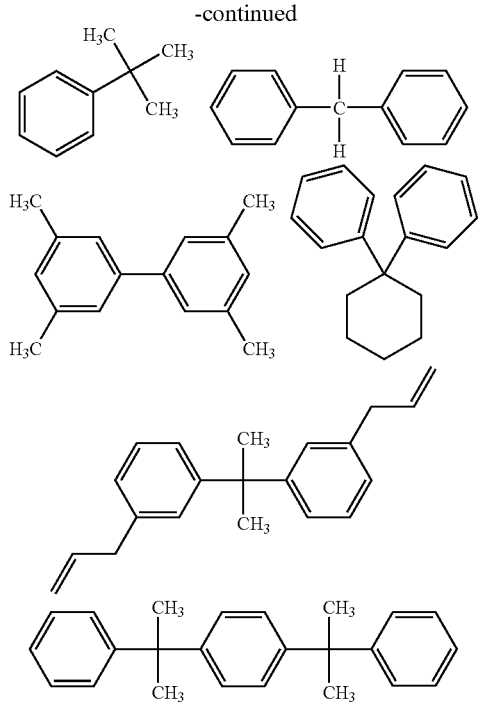

It is most preferable that the aromatic based resin includes one kind or more 5 to 10,000 phenoxy based units that are represented by the following Formula 5.

[Formula 5]

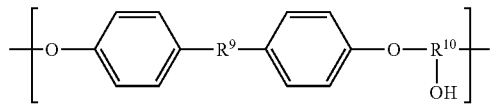

wherein $R^9$ is a direct bond, straight- or branched-chained alkylene having 1 to 6 carbon atoms, and $R^{10}$ is a direct bond, straight- or branched-chained alkylene having 1 to 6 carbon atoms.

It is preferable that Formula 5 is represented by the following Formula 6.

[Formula 6]

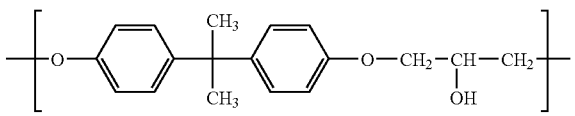

An end of the aromatic based resin may be an OH group.

In the present invention, the unit may improve the heat resistance of the film. The content of unit is in the range of about 0.1 to about 99% by weight, and preferably about 0.5 to about 40% by weight. Examples of the cyclic portion of the unit include maleic anhydride, maleimide, glutaric anhydride, glutarimide, lactone and lactame, but are not limited thereto.

According to an embodiment of the present invention, as the component of the resin composition, 1) a copolymer comprising the (meth)acrylate based unit and the maleimide based unit, and 2) the phenoxy based(phenoxy-based) resin may be used. In this case, it is preferable that the content of each component is in the range of 1 to 99% by weight. To be specific, the content of 1) the copolymer is preferably in the range of about 40 to about 99% by weight and more preferably in the range of about 75 to about 98% by weight. The content of the 2) resin is preferably in the range of about 0.5 to about 60% by weight and more preferably in the range of about 1 to about 30% by weight. In particular, in the case of when the content of the maleimide based monomer in the copolymer comprising 1) the (meth)acrylate based unit and maleimide based unit is 50% by weight or less, regardless of the mixing ratio of 1) to 2) components, it can show miscibility in respects to the entire range, and the optical film having the above composition is advantageous in that it has a single glass transition temperature $T_g$.

The thickness of the optical film that is manufactured by using the resin composition according to the present invention is in the range of 5 to 500 μm, and more preferably 5 to 300 μm, but is not limited thereto. The transmittance of the optical film is 90% or more, the haze property is 2.5% or less, preferably 1% or less, and more preferably 0.5% or less. The glass transition temperature of the optical film according to the present invention is 95° C. or more and more preferably 100° C., and the glass transition temperature may reach 125° C. or more.

The present invention also provides a method for controlling a photoelasticity coefficient of an optical film by controlling the content of an aromatic based resin having a chain having the hydroxy group containing portion and aromatic moiety.

In addition, the present invention provides a method for preparing an optical film, controlling photoelasticity coefficient of an optical film by controlling the content of an aromatic based resin having a chain having the hydroxy group containing portion and aromatic moiety while the resin composition is prepared and the method controls, wherein the method comprises preparing a resin composition comprising a (meth)acrylate based resin comprising one or more (meth)acrylate based derivatives, and an aromatic based resin having a chain having the hydroxy group containing portion and aromatic moiety; and shaping a film by using the resin composition. The optical film may be further uniaxially or biaxially stretched.

The resin composition may be manufactured by melting, mixing, and blending the above components. The melting and the mixing of the components may be carried out by using an extruder.

The resin composition may further include a lubricant, an antioxidant, a UV stabilizer, a thermal stabilizer and the like that are generally used.

When the optical film is manufactured, a method that is known in the art may be used, and in detail, an extrusion molding method may be used. For example, after the resin composition is dried under a vacuum and removes dissolved oxygen, the composition is supplied from the raw material hopper to a single or twin extruder that is substituted with nitrogen in respects to the extruder, and melted at a high temperature to obtain a raw material pellet, the obtained raw material pellet is dried under a vacuum, melted from the raw material hopper to a single extruder that is substituted with nitrogen, passes through a coat hanger type T-die, and a chrome-coated casting roll and a drying roll to manufacture the film.

The stretching process may be carried out by using any one of a longitudinal direction (MD) stretching and a transverse direction (TD) stretching or both of the longitudinal direction stretching and the transverse direction stretching. In the case of when both of the longitudinal direction stretching and the transverse direction stretching are carried out, any one of them may be first carried out and then the other may be carried out, or both of them may be carried out simultaneously. The stretching may be carried out through a single step or through multi-steps. In the case of when the stretching is carried out in the longitudinal direction, the stretching may be carried out by using a difference in speed between rolls, and in the case of when the stretching is carried out in the transverse direction, the tenter may be used. The rail initiating angle of the tenter is 10° or less, a bowing phenomenon that occurs when the transverse direction stretching is carried out is suppressed, and the angle of the optical axis is regularly controlled. By carrying out the transverse direction stretching through multi-steps, the suppression phenomenon of the bowing phenomenon may be obtained.

The stretching may be carried out at a temperature in the range of (Tg−20° C.) to (Tg+30° C.) when the glass transition temperature of the resin composition is $T_g$. The glass transition temperature means a range from a temperature at which storage elasticity of the resin composition starts to be reduced and the loss elasticity starts to be larger than the storage elasticity to a temperature at which alignment of the polymer chain is loosened and removed. The glass transition temperature may be measured by using a differential scanning calorimeter (DSC).

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

The stretching may be carried out through a separate step that is different from the shaping of the film, or carried out through one step in the same process as the shaping of the film.

Since toughness of the stretched film is increased, a disadvantage of the (meth)acrylate based film that is easily broken may be effectively compensated.

The optical film according to the present invention may be provided with an additional layer comprising at least one of an organic substance and an inorganic substance on at least one side, and an adhesion property in respects to a retardation value, a compensation property and/or a polarizer may be controlled. Examples of the organic substance include cellulose, polyimide, polyester, polyurethane, liquid crystal and/or a derivative thereof, and examples of the inorganic substance include $TiO_2$, ITO and the like, but are not limited thereto.

In addition, the present invention provides an information electronic device comprising the optical film. Examples of the information electronic device include display devices such as a liquid crystal display, an organic light emitting diode (OLED) and the like.

In one embodiment, the liquid crystal display according to the present invention is a liquid crystal display device comprising a liquid cell, and a first polarizing plate and a second polarizing plate that are provided on both sides of the liquid crystal cell, and between at least one of the first polarizing plate and the second polarizing plate and the liquid crystal cell, the optical film according to the present invention may be provided. That is, between the first polarizing plate and the liquid crystal cell, between the second polarizing plate and the liquid crystal cell, or both between the first polarizing plate and the liquid crystal cell and between the second polarizing plate and the liquid crystal cell, one or more optical films according to the present invention may be provided.

MODE FOR INVENTION

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

EXAMPLE

Polymerization of the poly(N-cyclohexylmaleimide-co-methylmethacrylate) resin

Preparation Example 1

247.8 g of methyl methacrylate, 24.8 g of N-cyclohexylmaleimide, and 295.8 g of toluene were put into the shallow bed having the volume of 1 L, nitrogen bubbling was carried out for 15 min to remove dissolved oxygen, and the temperature was maintained at 80° C. After dissolved oxygen was removed from the solution in which 1 g of AIBN initiator and 0.25 g of 1-octylmercaptane were dissolved in 197.2 g of toluene and 223.0 g of methyl methacrylate, the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

After the reaction was finished, the conversion rate of the monomer was 85%, in respects to the molecular weight, the weight average molecular weight (Mw) was 97,000 and the number average molecular weight (Mn) was 46,000. The content of N-cyclohexylmaleimide in the final polymer was 6.5% by weight as the result of element analysis.

Preparation Example 2

272.6 g of methyl methacrylate, 99.1 g of N-cyclohexylmaleimide, and 345.1 g of toluene were put into the shallow bed having the volume of 1 L, nitrogen bubbling was carried out for 15 min to remove dissolved oxygen, and the temperature was maintained at 80° C. After dissolved oxygen was removed from the solution in which 1 g of AIBN initiator and 0.25 g of 1-octylmercaptane were dissolved in 147.9 g of toluene and 123.9 g of methyl methacrylate, the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

After the reaction was finished, the conversion rate of the monomer was 82%, in respects to the molecular weight, the weight average molecular weight (Mw) was 97,500 and the number average molecular weight (Mn) was 48,100. The content of N-cyclohexylmaleimide in the final polymer was 24% by weight as the result of element analysis.

Preparation Example 3

223.0 g of methyl methacrylate, 198.2 g of N-cyclohexylmaleimide, and 419.0 g of toluene were put into the shallow bed having the volume of 1 L, nitrogen bubbling was carried out for 15 min to remove dissolved oxygen, and the temperature was maintained at 80° C. After dissolved oxygen was removed from the solution in which 1.13 g of AIBN initiator and 0.25 g of 1-octylmercaptane were dissolved in 74.0 g of toluene and 74.3 g of methyl methacrylate, the reaction solution was dropped onto the reactor for 4 hours and agitated to perform the polymerization. After the reaction was additionally carried out at 80° C. for 2 hours, the reaction temperature was increased to 90° C. After the reaction was performed for 8 hours, 0.13 g of AIBN was added while AIBN was dissolved in toluene and the reaction was additionally carried out for 10 hours.

Mixing of the Phenoxy Resin and the poly(N-cyclohexylmaleimide-co-methylmethacrylate) resin Examples 1 to 9 and Comparative Examples 1 to 2

The resin composition that was described in the following Table 1 was supplied to the extruder that was substituted by nitrogen from the raw material hopper to the extruder and had the size of 16 φ, and melted at 250° C. to obtain raw material pellets, the obtained raw material pellets were dried under a vacuum, melted by using the extruder at 250° C., and passed through the coat hanger type of T-die, the chrome coated casting roll and the drying roll to manufacture the film having the thickness of 80 μm. The physical properties of the film are described in the following Table 1.

As the phenoxy based resin, PKFE ($M_w$=60,000, $M_n$=16,000, $T_g$=98° C.) that was manufactured by InChemRez®, Co., Ltd. was used, and as the (metha)acryl based resin, the poly(N-cyclohexylmaleimide-co-methylmethacrylate) resin in which the content of N-cyclohexylmaleimide polymerized in Preparation Example 1 is 6.5% by weight was used.

The glass transition temperature ($T_g$) of the film was measured by using a differential scanning calorimeter (DSC2010) manufactured by TA instrument, Co., Ltd. Under the nitrogen atmosphere, analysis was performed at a heating rate of 10° C./min, and the measured glass transition temperature was determined as the middle temperature of the heat capacity rapid change area in the second scan.

The transmittance and the haze of the film were measured by using the reflectance-transmittance meter (HR-100, Murakami color research Lab.) by JIS K 7105, and three average values were used to obtain the result. The transmittance corresponds to the total transmittance Tt showing the total amount of the transmitted light, and the diffusion penetration ratio Td was measured by using 5% of the integral area to calculate the Haze (=Td/Tt×100).

The photoelasticity coefficient was measured by drawing the film while force that was applied to the film in a tension system was increased, measuring the retardation for each case, plotting in respects to 'stress vs retardation', and evaluating the slope.

Figure 2:
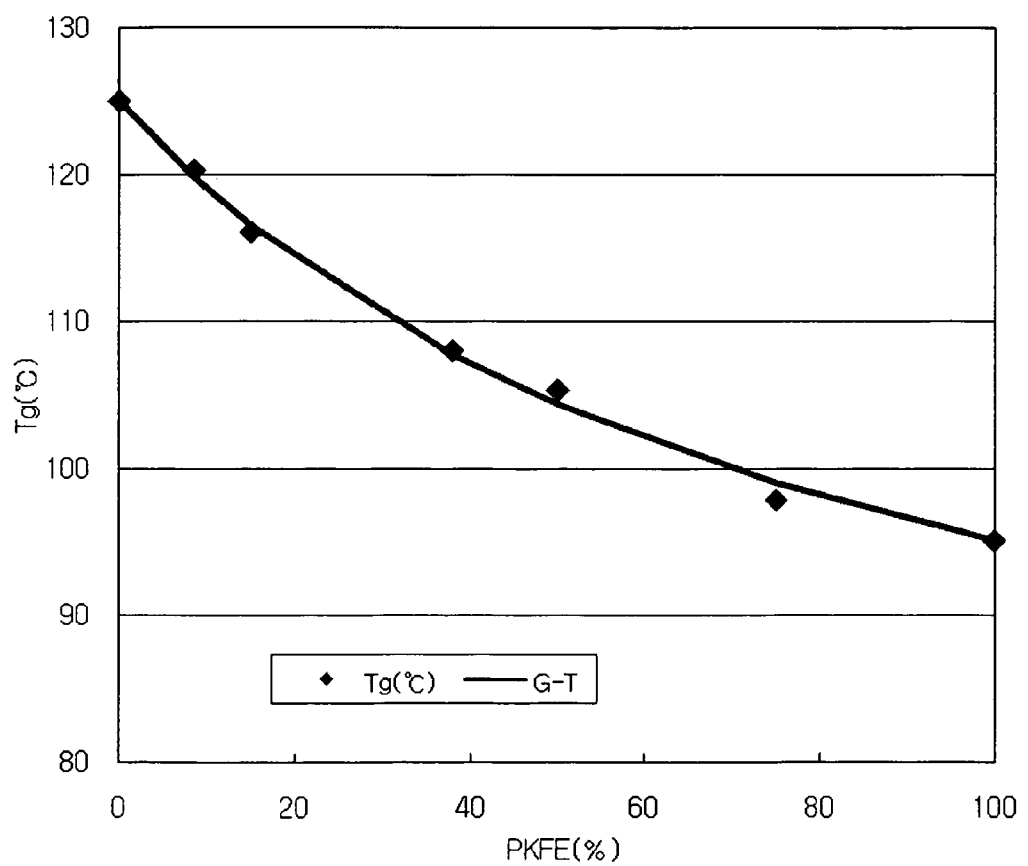
FIG. 2 illustrates a glass transition temperature of the optical film manufactured in Example.

In the film according to Example, the correlation between the content of the aromatic based resin having the chain having the hydroxy group containing portion and aromatic moiety and the photoelasticity coefficient is shown in FIG. 1. According to FIG. 1, the content x of the aromatic based resin and the photoelasticity coefficient y satisfied the direct proportion equation in which the constant a was 0.6573 and the constant b was 4.3567. In addition, the glass transition temperature of the film according to Example is shown in FIG. 2.

TABLE 1

| | phenoxy based resin (% by weight) | (metha)acrylate based resin (% by weight) | Tg (° C.) | transmittance (%) | Haze (%) | photoelasticity coefficient ($\times 10^{-12} m^2/N$) |
|---|---|---|---|---|---|---|
| Example 1 | 2 | 98 | 123.7 | 94.5 | 0.2 | −3.0421 |
| Example 2 | 5 | 95 | 121.9 | 94.3 | 0.3 | −1.0702 |
| Example 3 | 8.5 | 91.5 | 120.3 | 94.3 | 0.1 | 0.68 |
| Example 4 | 15 | 85 | 116.1 | 94.2 | 0.5 | 4.52 |
| Example 5 | 38 | 62 | 108 | 94.1 | 0.3 | 22.2 |
| Example 6 | 50 | 50 | 105.3 | 94.7 | 0.4 | 26.6 |
| Example 7 | 75 | 25 | 97.8 | 94.6 | 0.7 | 46.77 |
| Example 8 | 85 | 15 | 97.2 | 94.5 | 0.2 | 51.52 |
| Example 9 | 95 | 5 | 95.7 | 94.4 | 0.3 | 58.09 |
| Comparative Example 1 | 100 | 0 | 95 | 94.5 | 0.3 | 60.55 |
| Comparative Example 2 | 0 | 100 | 125 | 94.5 | 0.2 | −3.5 |

The invention claimed is:

1. An optical film comprising:
a copolymer of a (meth)acrylate and maleimide; and
an aromatic based resin including 5 to 10,000 units that are represented by the following Formula 6:

[Formula 6]

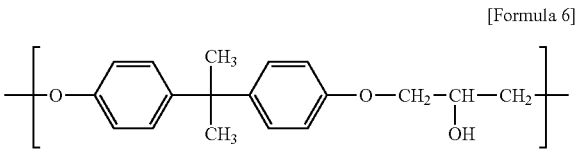

wherein said film has a photoelasticity coefficient in the range of more than $-3.5 \times 10^{-12} m^2/N$ and less than $60.55 \times 10^{-12} m^2 N$.

2. The optical film as set forth in claim 1, wherein the maleimide is selected from the group consisting of N-cyclohexylmaleimide, N-phenylmaleimide, N-methylmaleimide and N-butylmaleimide.

3. The optical film as set forth in claim 1, wherein the maleimide is in the range of about 1% to about 50%.

4. The optical film as set forth in claim 1, wherein the aromatic based resin has a number average molecular weight in the range of 1,500 to 2,000,000 g/mol.

5. An information electronic device comprising:

the optical film according to claim 1.

6. A method for preparing an optical film, by controlling photoelasticity coefficient of an optical film by controlling the content of an aromatic based resin while a resin composition is prepared, wherein the method comprises:

preparing a resin composition comprising a copolymer of a (meth)acrylate derivative and maleimide; and an aromatic based resin including 5 to 10,000 units that are represented by the following Formula 6:

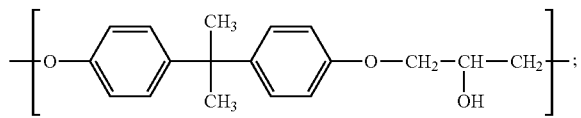

[Formula 6]

and shaping a film by using the resin composition.

* * * * *